United States Patent [19]
Pohl

[11] 3,906,134
[45]*Sept. 16, 1975

[54] WELDABILITY OF ARTICLES MADE FROM PLASTIC FOAMS

[76] Inventor: Gerhard Pohl, Professorenweg, 33, 63 Giessen 1, Germany

[ * ] Notice: The portion of the term of this patent subsequent to May 23, 1990, has been disclaimed.

[22] Filed: Apr. 3, 1972

[21] Appl. No.: 240,656

[30] Foreign Application Priority Data
Apr. 2, 1971 Germany............................ 2116092
May 13, 1971 Germany............................ 2123845

[52] U.S. Cl. ............... 428/206; 156/229; 156/273; 156/283; 156/291; 156/320
[51] Int. Cl.² ...................... B32B 7/14; B32B 33/00
[58] Field of Search ............ 156/77, 164, 272, 273, 156/274, 276, 279, 283, 290, 229, 320, 291, 494, 495, 496; 117/16, 20, 25; 161/88, 146, 148, 150, 156, 162, 170, 227, 228, 159

[56] References Cited
UNITED STATES PATENTS
| | | | |
|---|---|---|---|
| 3,150,024 | 9/1964 | Penman .............................. | 156/494 |
| 3,393,119 | 7/1968 | Dugan................................ | 156/273 |
| 3,734,813 | 5/1973 | Pohl.................................... | 156/283 |

FOREIGN PATENTS OR APPLICATIONS
| | | | |
|---|---|---|---|
| 1,046,328 | 10/1966 | United Kingdom................. | 156/273 |

*Primary Examiner*—Caleb Weston
*Attorney, Agent, or Firm*—Johnston, Keil, Thompson & Shurtleff

[57] ABSTRACT

The invention relates to the improvement of the weldability of articles of porous plastics, in particular of flexible polyurethane foams with an at least partial open cell structure. The improvement is obtained by incorporating a finely divided welding auxiliary into the porous article while stretching or mechanically deforming the porous article in at least one direction.

16 Claims, 1 Drawing Figure

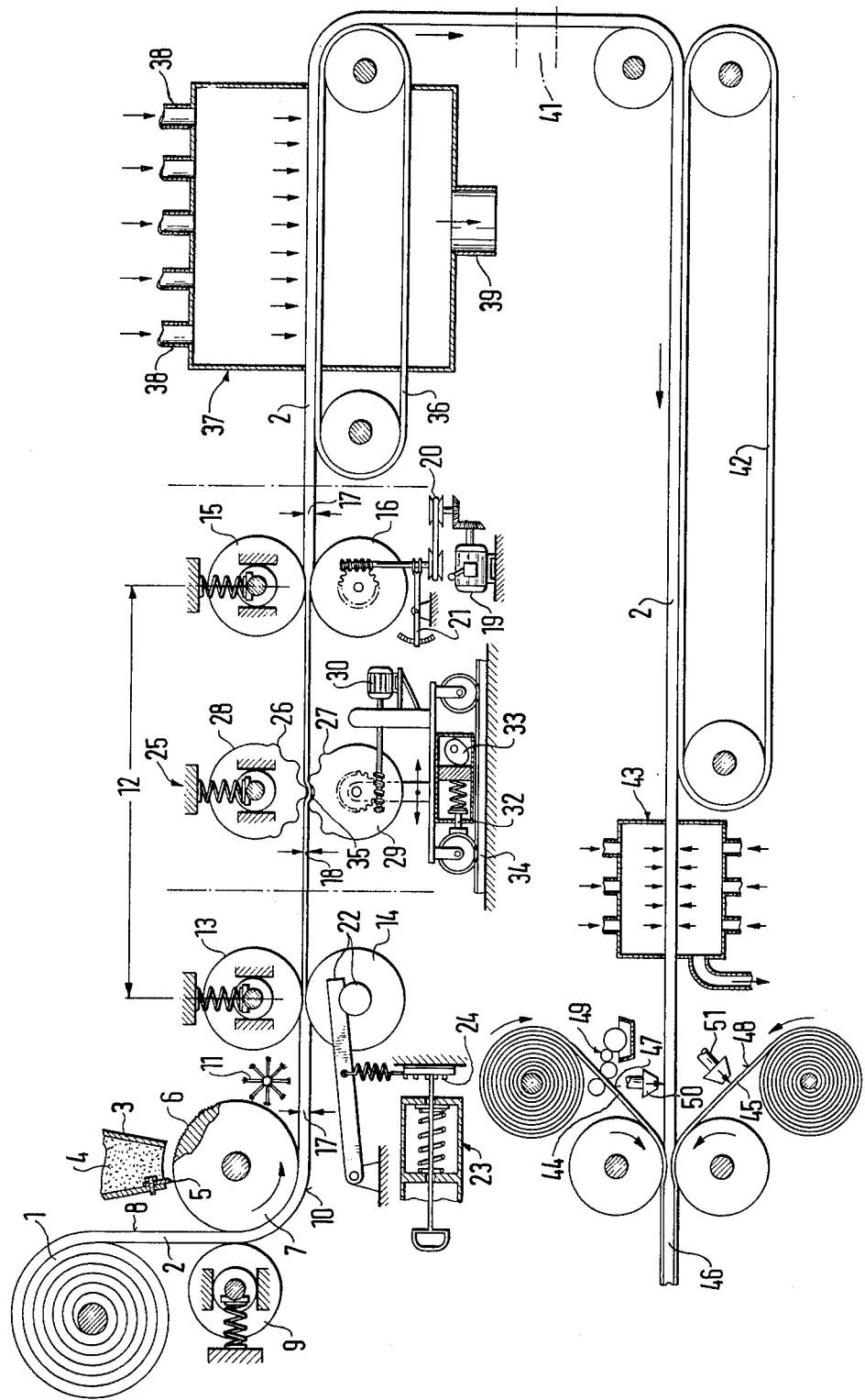

3,906,134

WELDABILITY OF ARTICLES MADE FROM PLASTIC FOAMS

BACKGROUND

This invention relates to the improvement of the weldability of articles made from plastic foams or plastic-like foam materials by means of welding aids. One aspect of the invention relates to a process for improving the weldability of articles made from plastic foam materials, wherein a welding aid is added to the foam material by a mechanical process. Another aspect of the invention also covers the welding of the plastic foam article so treated. The invention also relates to the foam objects obtained by welding the articles so pretreated. In addition the invention covers apparatus for carrying out the above mentioned processes.

Plastic foams are well known in the art and are manufactured on a large scale. Such foam materials are divided according to their cell structure into "closed-cell" foams in which the individual cells or pores are closed, and "open-cell" foams in which the cells communicate with one another. Also, however, there are "mixed cell" foamed plastics which have both open and closed cells. The foams are also divided according to their mechanical properties into hard or rigid foams and soft foams. The commonest raw materials for plastic foams at present are polyurethane-forming substances and polystyrene, but hardenable urea formaldehyde resins, polyvinyl chloride, polyethylene and other synthetic thermoplastic materials are also used.

For many applications plastic foam articles need to be welded, in order either to change their shape or to join them to other structures. Unfortunately, many plastic foams cannot be welded easily, if at all, so that many attempts have been made to make them weldable or to improve their weldability.

For welding a high-frequency field (usually termed high-frequency or HF welding) the material concerned must absorb enough energy in the alternating field to heat and so soften the plastic material. Since polyethylene, polystyrene and also polyurethane do not have the required high dissipation factor in an alternating field, the HF welding of foams made from soft plastics requires additives known as welding aids. Polyvinyl chloride, polyvinyl acetate and copolymers of vinyl chloride and vinyl acetate have already been used as welding aids. Often the welding aid is used in film form, the film being joined to the foam material during welding to form a laminate. In another method powdered welding aids are added to the raw materials of the plastic foams to give foamed products containing a finely divided welding aid. The welding of such articles by the HF process can shape the foam by means of welded seams, but it is impossible to weld on another apolar material, for example, a fleece or cloth, except by providing more welding aid on the surface of the foam products. Another disadvantage is that the incorporation of relatively large quantities of welding aids greatly increases the specific gravity of the foams, and the presence of large quantities of welding aids is detrimental to the elastic properties of the foams.

In another attempt to make open-cell foams weldable or more weldable, they have been impregnated with dispersions of a welding aid and the dispersion medium (generally water) has then been removed, for example, by drying. In this process most of the welding air is deposited in the interior of the foam. The foam article so treated can be welded internally, with a continuous weld, but it is generally impossible to weld covering materials, for example, surface sheets and/or backings, to the surface of the impregnated foam article without applying more welding aid. This process also has the disadvantage that the removal of the dispersion medium consumes a relatively large quantity of power.

In another known process powdered welding aid is applied to the surface of the plastics foam articles. This makes it possible to weld the surfaces of the foam articles to other materials, but not to weld the interiors of the foam products.

According to another known method of making foam materials weldable or more weldable, the welding aid is applied to the surface of the foam articles straight from the melt. This method, also, renders only the surface of the foam article weldable. It is not generally suitable for forming a continuous seam inside the article.

Another known process uses a "pinning" method, in which filiform welding aid in fleece form is plunged into the foam material by means of pins from at least one side. This method has the disadvantage that pinning impairs the mechanical properties of the form, such as its tensile strength, resilience or the like.

OBJECTS

An object of the present invention is therefore to improve the weldability of articles made from plastic foam material products by means of welding aids.

A particular object of the invention is to provide a process for welding articles made from foam materials by means of welding aids, in which it is possible to weld these articles internally as well as on their surfaces.

Another object of the invention is to provide a process by means of which the weldability of articles made from foam material products is improved by applying and introducing a finely divided welding aid, and by means of which articles made from foam material products and pretreated in this way can be welded.

A more particular object of the invention is to provide a process by means of which the weldability of foamed plastic articles in a high-frequency electrical field is improved by applying a finely divided welding aid with a high dissipation factor in the high-frequency field to the surface of such an article and by working the welding air into the interior of such an article and welding an article so pretreated in a high-frequency field.

Further objects of the invention are welded foamed plastic articles which are produced with the aid of finely distributed welding aids that are applied to the surface and introduced into the interior of the foam material products.

Additional objects of the invention are apparatus for treating the plastic foam articles in order to improve their weldability and apparatus for welding the pretreated articles made from these foam material products.

BRIEF SUMMARY OF THE INVENTION

According to the invention these objects are achieved by means of processes and apparatus in which the weldability of articles made from plastic foams with at least some open cells is improved by distorting these articles and by bringing them into contact with a finely divided solid welding aid while in a distorted condition.

DETAILED DESCRIPTION OF THE INVENTION

Bringing the finely divided welding aid into contact with the foam articles has the effect of applying the welding aid to the articles. In connection with the invention distortion is understood to mean deformation of the foam articles combined with extension in at least one plane of the article. The open cells in the plastic foams are therefore deformed, causing a change in the size and shape of the cross section of the open cells and in the volumes of the cells. The cross sections of the open cells are enlarged so that the finely divided solid welding aid can penetrate, or can penetrate more easily, into the interior of the foam articles. After the welding aid has been applied and has penetrated into the articles, the forces which have distorted the articles are removed so that the articles, are no longer distorted. Since most plastic foams, especially the plastic soft foams, are highly resilient, the plastic foam articles substantially resume their predistortion shape. While the articles are recovering their original shape, the cross sections of the individual open-cells also change. They, too, return substantially to their original size and shape, with the result that the welding aid which has penetrated into the interior of the articles is to a large extent enclosed in the cells of the articles.

In accordance with the invention the foam articles can be distorted by any mechanical process desired, provided that the process, firstly, does not destroy the article and, secondly, changes the cell cross section enough for the welding aid to enter.

Within the scope of the invention the foam articles can be distorted while or, preferably, after being brought into contact with the finely divided solid welding aids. Alternatively, of course, the article can be distorted before it comes into contact with the welding aid. The essential feature, therefore, is that at or after contact between the foam article and the finely divided welding aid there is a phase in which the article is in a distorted condition, so that the welding aid can penetrate into the interior of the article. This phase during which the welding aid penetrates into the article made from foam material with at least some open cells is followed by a phase during which, after removal of the distorting forces, the article substantially recovers its original shape. Since the individual cells in the foam material also substantially recover their original shapes, volumes and open cross sections, at least a substantial proportion of the welding aid which has penetrated into the interior of the articles is enclosed in the cells of the foam.

Obviously, not only the degree of distortion of the foam article but also the sizes of the individual cells and of the cross sections of the open cells in the foam material and the sizes and shapes of the particles of the welding aid are important factors in the performance of the invention. These features will be discussed in more detail below, in a detailed discussion of the foam material and of the welding aid.

As already stated, any mechanical process desired can be used to distort or deform the foam articles with at least some open cells, provided that the processes open the foam cells enough to permit penetration of the welding aid, do not destroy the foam article and do not substantially impede the re-formation of the article's original shape. Examples of suitable mechanical processes for distorting the foam article are the effects on the article of pulling, pressing, stamping, tapping, beating, bending, shearing, twisting and/or vibrating.

Preferably the foam article is pulled, the tensile load being applied so that the article is stretched in one direction during distortion. This distortion of the article may be combined with other mechanical processes, in particular, the combination of a tensile load with a compressive load is advantageous, the article being preferably subjected to successive compressive and tensile loads. A combination of vibratory movements with tensile and/or compressive loads also promotes penetration of the welding aid into the interior of the article.

The articles may be distorted in one direction only or in a plurality of directions. Also, the same or a similar type of distortion may be repeated once or more times in the same direction. Further details of distortion of the plastic article and application of the welding aid will be given below with reference to apparatus embodying the invention and the drawings.

A further explanation will now be given regarding the mechanism which is assumed to operate during the distortion of the foam article and the introduction of the welding aid, without, however, in any way restricting the invention as a result of this interpretation. It is assumed that, while the finely divided solid welding aid is becoming embedded in the article made from a foam material at least some of whose cells are open, the following events take place.

When the foam articles are distorted in at least one direction, all the cut cells situated on the cut surface of the foam are first enlarged as regards both their open cross section and the volumes of the open cells. As a result larger open-cell cross sections and the larger open-cell volumes are available to receive the finely divided welding aid than would be available in undistorted foam. Distortion also makes accessible to the welding aid cross sections and cell interiors which would be unable to receive welding aid when undistorted, due to the relationship between the welding aid particle size and the open-cell cross section. Distortion of the foam article probably also opens many cells which were previously only apparently sealed off by cell walls. These cells which were only apparently closed when the foam article was not stressed also open during distortion and become accessible to the welding aid. A further possibility is that distortion tears open particularly thin cell walls which do not substantially affect the elastic properties of the foam, thereby further increasing the receptivity of the foam article as regards the welding aid.

The foam articles (with at least some open cells) which are to be distorted in accordance with the invention may have any shape. Preferably, however, they are in the form of sheet or sheeting or other objects having a fairly large dimension in one plane and a substantially smaller dimension in another plane perpendicular to the first plane. The invention is particularly useful for improving the weldability of webs of foam material (foam sheeting), since it is then possible to use a continuous process to bring the foam web into contact with the welding aid while distorted and also since the subsequent process steps can be carried out continuously. The webs, sheets, tapes or other similar articles whose weldability is to be improved are generally 1 to 20 mm thick. The articles are preferably 2 to 15 mm thick, more particularly 3 to 12 mm thick. The width of the webs or sheets may vary over a wide range, but often sheeting or sheets with a width between about 100 and about 300 cm are used. Narrower webs (tapes) or sheets can of course, be provided with the welding aid in accordance with the invention, but it is generally preferable first to introduce the welding aid into a wide web or sheet and then to cut the web or sheet so treated into tapes or ribbons, either before or after welding.

Various application and distribution processes can be used to bring the solid welding aid into contact with the foam articles having at least some open cells. It is essential only that the welding aid should be applied as evenly as possible to the article surface concerned. Even distribution in the present context does not mean that even the very smallest units of area of the foam surface must receive equal thicknesses of welding aid. On the contrary, finely divided solid welding aids can also be applied in regular fashion, for example, in the form of a fine screen or grid, with a large number of small dots or lines. Grid-like application of the finely divided welding aid in this way still represents even application and distribution of the welding aid over the surface of the foam article within the scope of the invention. Suitable applicator devices for applying the finely divided solid welding aid and for bringing it into contact with the foam articles are, for example, applicator rolls, preferably engraved with a form of grid, and conventional scattering and distributing means, for example, having nozzles, mesh screens or the like. A foam web may advantageously be loaded by means of an engraved screen roll on to which the moving web is pressed by a roll situated on the other side of the web. This way of applying the welding aid has the advantage that the foam web is already undergoing preliminary distortion, with the effects already mentioned, while being applied to the engraved applicator roll. Preferably, however, to ensure greater penetration of the welding aid, this method of distortion is combined with at least one other distortion stage in which the moving foam web is distorted or stretched in the operative direction. If the web or another sheet, or sheeting-like structure is stretched in this way lengthways or even crossways, the degree of extension can vary over a wide range according to the mechanical properties of the foam material, the size and cross sections of the open cells and the welding-aid particle size. Preferably, however, a range of approximately 5 to 20% is used for lengthways or crossways extension of the foam web or similar foam article, and approximately 7 to 15% extension is preferred. These percentages relate to the dimension of the foam article before distortion or extension. During the distortion of foam webs by means of extension in the operative direction the thickness of the foam web is reduced, for example, by 5% in the case of a polyether-polyurethane foam web with a thickness of 5 mm and a density of 35 kg/m$^3$ extended by 10%.

The distortion of the articles made from plastic foam materials with at least some open cells provides, in accordance with the invention, an opportunity for the finely divided solid welding aid to penetrate into the interior of the foam article. Generally, however, another force must be applied to feed the welding-aid particles into the interior of the foam article, in addition to the force exerted in applying the welding aid. This additional force is preferably the effect of the earth's gravitational field. The foam articles are therefore preferably arranged so that the opencell cross sections and interiors enlarged by distortion permit, as far as possible, the unimpeded entry of freely falling welding-aid particles into the interior of the foam article. In the case of a foam web, the web is preferably distorted in the operative direction in a horizontal plane, so providing optimum conditions for the entry of freely falling welding-aid particles.

Alternatively, however, the welding aid particles can be introduced into the distorted foamed plastic by other means. For example, they may be pressed, blown or sucked in.

The depth to which the welding aid particles enter the foam may be varied according to the welding depth and type of welding required. In the case of thin foam webs or similar flat articles approximately 1 to 3 mm thick, complete or largely complete penetration of the welding aid into the articles can be obtained by application of the finely divided welding aid to only one of the two large faces of these articles and by effecting distortion only once in the horizontal plane. With web thicknesses of 2 mm upwards, however, it is generally preferable for the welding aid to be applied to both large surfaces and for the foam web to be distorted at least once from each side at or after application of the welding aid, in order to form a continuous, sufficiently strong weld on both large surfaces and to ensure that both large surfaces can be welded satisfactorily to covering materials. If gravity is utilized in order to feed or convey the welding-aid particles, the foam webs or similar articles must be guided or arranged so that welding aid particles can be applied to and infiltrate from first one and then the other of the two large surfaces. When the welding aid is introduced by other means, for example, by being pressed in, it can be fed to both large surfaces of the foam articles and introduced into the foam articles from both sides simultaneously.

In most cases the welding aid must penetrate into the foam article a distance equal to at least about 20%, preferably at least about 30% of the article thickness from each side to which it is applied in order to ensure the desired welding effect. To produce a continuous weld extending right through the foam article it is generally desirable for the welding aid to penetrate right through the article. As already stated, this can be achieved by applying the welding aid to one side only in the case of foam webs of low or moderate thickness, but the welding aid may need to be applied and introduced on both sides of a thick foam web. A person skilled in the art will realize immediately that there will be a welding aid concentration gradient across the thickness of a foam web or similar article, whether the welding aid is applied and introduced on one side or both. If the welding aid is applied to one side only, the concentration decreases from that side to the other side of the web or similar article. If the welding aid is applied and introduced on both sides, its concentration decreases from both sides towards the center of the web or similar article. It must be noted, however, that with the novel process there is no difficulty in distributing a sufficient concentration of the welding aid throughout the cross section of the sheet, or sheeting-like structure (provided its thickness lies within the above mentioned range) to provide a continuous weld throughout the foam article during subsequent welding.

For other applications, however, it is preferable not to distribute the welding aid throughout the cross section of the foam article, in which case application of the welding aid to one side only leaves the other side of the article devoid of welding aid or containing so little welding aid that it remains unwelded during subsequent welding. Similarly, when the welding aid is applied to both sides it is possible to ensure that a central zone of the foam article is not rendered weldable.

The foam articles used in connection with the invention are foamed synthetic plastics or synthetic plastic foams with at least some open cells. Foam materials of this kind have both open and closed cells. Preferably, however, the foamed plastics used are at least predominantly open-celled, and open-celled foamed plastics may vary widely with the plastic raw material, the cell size and cell structure, the manufacturing process and other factors. Generally, however, soft foam materials are used, which do not offer excessive resistance to distortion of the foam articles in accordance with the invention and which on account of their elastic properties return at least substantially to their pre-distortion state when the distorting forces cease to be applied. In each individual case the particular welding process used is highly relevant to the choice of the plastic raw materials and of the welding aid. For welding in a high-frequency field, for example, the plastic raw materials for the foam will have only a low dissipation factor, for example, polyethylene, polystyrene and in particular polyurethane. The welding aid, on the other hand, will be a particulate material with a high dissipation factor. In the various forms of thermowelding, however, it does not matter whether the welding aid has a high dissipation factor.

Articles made from at least partly open-celled polyurethane foams, more particularly open-celled soft polyurethane foams, are of particular interest in connection with the invention. Since these foams and their manufacture have been described in numerous books, articles and patent specifications, it will be noted here only that polyurethane foams are manufactured by polymer formation from polyhydroxy compounds and polyisocyanates. The polyhydroxy compounds used are generally hydroxy-terminated polyether or hydroxy-terminated polyester, and the polyurethanes made from these hydroxy-terminated raw materials are therefore called "polyether foams" or "polyester foams." Both types of polyurethane foam are suitable for use in connection with the invention.

The polyurethane foams used in accordance with the invention preferably have a gross density or density of about 12 to 50 kg/m$^3$, more particularly about 16 to 45 kg/m$^3$. At least some of the pores or cells of the preferred soft polyurethane materials are open, and these are generally approximately 5 to approximately 25, preferably 10 to 20, pores or cells per cm length of the foam surface. The elastic properties of the preferred soft polyurethane foams may also vary over a wide range, but the impact strength at 20°C. is generally 20 to 40% in the case of polyurethane foams based on a polyester polyol and 40 to 50% in the case of foams based on a polyether polyol.

For many applications it is desirable for the foams not to burn, or to be self-extinguishing once a flame has disappeared. In many countries, for example, foams for motor car upholstery or the building industry must fulfill this requirement. The plastic foam articles used in accordance with the invention can contain the known additives for improving fire-resistance.

Further details of the foams and also of the additives which render them self-extinguishing or fire-proof will be found in the relevant literature.

The welding aids used in accordance with the invention are thermoplastic materials which are solid at room temperature, but soften and adhere to the walls of the cells in the foamed plastics when heated. When these thermoplastic materials cool to room temperature they become solid again. The process of softening when heated and setting or solidifying when cooled is repeatable in thermoplastic materials. When heat and pressure are applied, therefore, a continuous weld is formed in the foam articles in accordance with the invention by means of the welding aid. The welding aids used in connection with the invention are generally synthetic thermoplastic materials and are usually applied in flowable discrete particle solid form.

In a preferred embodiment suitable for HF welding the welding aids are thermoplastic materials, more particularly synthetic thermoplastic materials with a high dielectric dissipation factor, usually greater than 10$^{-2}$. The following substances are examples of such welding aids: homopolymers and copolymers of vinyl chloride, vinyl acetate, vinyl propionate, vinylidene chloride, acrylates, methyl methacrylates and the like. Another group of synthetic thermoplastic materials suitable for use as welding aids in accordance with the invention are polyamides, more particularly ternary copolyamides of the nylon 6/6, 6/12 type.

The weldability of articles made from polyurethane foams can be improved particularly advantageously by means of copolymers made from preponderant proportions of vinyl chloride and smaller quantities of vinyl acetate.

Copolymers made from approximately 70 to 90% by weight of vinyl chloride and 30 to 10% by weight of vinyl acetate have proved particularly suitable for this purpose. Such copolymers are manufactured in the art by suspension polymerization and are commercially available. The particles are substantially spherical, with small irregularities in their surfaces. The particle size preferably varies between about 1.5 and 200 microns, the major proportion having a particle size between about 50 and 70 microns. These copolymers are generally insoluble in tetrahydrofuran and also in cyclohexanone. The K-value as per Fikentscher (defined in DIN 5376) are usually between 40 and 60.

The particle size of the welding aid depends on the cross sections of the cell apertures in the foams from which the articles are made. Obviously the particles must not be so large that the welding aid, or a substantial proportion of the welding aid, cannot penetrate into the foam article when the latter is in a distorted condition. On the other hand, the particles must not be so small as to fall through the distorted article. A particle size from only slightly greater than 0 to about 300 microns will generally be adequate, and particle sizes of about 1 to 250 microns are preferred.

In addition to the particle size the shape of the particles and the pourability of the welding aid are important factors. Since the polymers and copolymers mentioned as possile welding aids can be produced as fine grain materials with the above mentioned particle sizes by suspension polymerization, suspension polymers, which are usually substantially spherical in shape, are particularly suitable as welding aids. Such welding aids also possess the required high pourability, which makes it easier for them to infiltrate into the distorted foam articles. An irregular particle shape may be an advantage in anchoring the welding aid inside the articles, and known variants of suspension polymerization can advantageously be used in the manufacture of the welding aid in order to make the particle shape deviate considerably from the spherical shape or to form depressions or projections on the surfaces of substantially spherical particles.

The thermoplastic materials used as welding aids preferably have a melting point or softening range which is both high enough to make the welded articles resistant enough to high temperatures during use and low enough to permit welding of the articles at temperatures low enough not to damage the foams. The lower limit for the melting point or softening range is usually 90°C. The upper limit depends to a very large extent on the resistance of the foam to high temperatures. In the case of soft polyether-based polyurethane foams it is preferably not higher than about 150°C., whereas for a soft polyester-based polyurethane foam it can be approximately 200°C. of even higher.

Advantageously, in order to prevent the properties of the foams from being impaired by the welding aids, the welding aids are unplasticized synthetic thermoplastic materials. It is also an advantage, as regards the performance characteristics of the welded plastic articles, for the welding aids to be resistant to ageing and washing and to gasoline and other common solvents.

The quantity of welding aid introduced into the foam article may vary widely. The optimum quantity depends both on the chemical natures of the welding aid and of the foamed plastics and on the density and thickness of the foam web or other foam article. In general approximately 15 to approximately 150 g. welding aid per m² of the foam surface on each of the two large surfaces of a foam web are sufficient. Polyurethane foams based on a polyester polyol usually require less welding aid than a polyurethane foam based on a polyether polyol of equivalent volumetric density. The higher the volumetric density of the foam article, the greater the quantity of welding aid usually required. The quantity of welding aid required is approximately proportional to the density. The quantity of welding aid required in relation to the surface area of the foam article also increases with the thickness of the foam web, but this increase is generally less than linear.

In a preferred embodiment of the invention the introduction or embedding of the welding aid into the interior of the plastic foam article with at least some open cells is followed by thermofixing of the introduced welding-aid particles in the foam article. To this end the foam articles containing the welding aid are heated until at least the surfaces of the thermoplastic welding-aid particles soften. The discrete particles then become attached, for example, sintered or stuck, to the walls of the cells in the foam. This prevents the positions of the particles relative to the foam from changing during subsequent processing of the foam article. The heating for the purpose of thermofixing the welding-aid particles can be carried out easily by means of hot gases, for example, hot air. The temperature of the hot gases and the treatment time in each case depend on the melting point or softening range of the welding aid and on the thickness of the foam layer. Treatment lasting from about 5 seconds to about 2 minutes with hot air at a temperature of approximately 120° to 200°C. is usually sufficient, the temperature depending in each case on the heat-distortion temperature of the foam and on the softening range of the welding aid. Alternatively thermofixing may be carried out using other methods of heating, for example, a high frequency electrical field if the welding aid has a high dielectric disspitation factor.

The foam article is not welded during thermofixing, since no pressure or very little pressure is exerted on the foam articles during the heating.

The foam articles containing the (preferably thermofixed) welding aid particles for improving their weldability can be welded by various basically known methods.

In the case of HF welding the foam articles, pretreated as described to improve their weldability, are placed in the capacitive field of a suitable high-frequency welding tool or welding set. Since welding aids with a higher dissipation factor than $10^{-2}$ are used in this method of welding, the welding aids are rapidly heated and softened in the high-frequency field.

The frequency of the welding set during the HF welding is not of paramount importance but depends on the regulations, which vary from one country to another. HF welding sets with a frequency of 27.12 MHz are often used. The welding electrodes of the HF welding set may be of hard brass or of steel. The known sets with separate generators amd separate welding presses, or with generators and hand tongs interconnected by flexible leads, or combined sets in which the generators and welding presses are combined in a single tool can be used. The pressures exerted by the welding presses or tongs are generally low, for example, approximately 3 to 33 kg/cm². The foam article awaiting welding is inserted in the welding press or other suitable welding means, and after the electrode has been put on and the pressure applied the HF voltage is applied and disconnected. The duration of voltage application depends on the type of foam and welding aid and on the thickness of the foam article and varies from about 1 second to about 15 seconds. The pressure on the resulting weld is maintained until it has cooled, when the electrode is lifted off the finished weld. Numerous variants of HF welding are possible within the scope of the invention. For example, seams can be formed of rows of spot welds formed with contact point electrodes. In another method feed rollers in the form of electrodes can be used to advance foam webs while applying mechanical pressure and simultaneously welding the webs.

HF welding can be used to shape or stamp the foam articles or to make laminates from the foam articles pretreated in accordance with the invention and suitable other materials or articles. In making laminates the foam articles rendered weldable as already described can, in accordance with the invention, be connected by their surfaces to one or more similar or different articles by welding on one or more sides. If so, it is a particular advantage if the application of the welding aid to the distorted foam and any subsequent thermofixing of the welding aid leave enough welding aid on the surface to permit welding to another article (for example, a covering material) without any further welding aid being required.

The manufacture of laminates is of particular interest in the case of foam webs which have been rendered weldable, since it is possible to use continuous processes in which a covering material is welded to one or both large surfaces of the foam web. Suitable covering materials are textile materials made from natural or synthetic fibers or from a very wide range of fiber mixtures. The textile materials may be in the form of woven or knitted fabrics or fleeces. Other suitable covering materials for making laminates from foam articles in accordance with the invention are sheeting made from natural or synthetic high polymers.

As already stated the foam articles rendered weldable by means of the invention can be welded by other methods than HF welding. Examples of such welding methods are thermal contact welding and thermal impulse welding. Thermal contact welding is carried out with continously heated welding tools or sets, whereas in thermal impulse welding the welding tool or set is heated and cooled in brief pulses. These welding methods are well known in the art and need not be discussed here in detail. The same welding aids can be used for both these thermowelding methods as in HF welding, but it is also possible to use thermoplastic welding aids which do not have a high dielectric dissipation factor. Otherwise the information given in connection with HF welding applies to a large extent also to these welding methods.

The invention will now be described in more detail with reference to the accompanying drawing, which is a diagrammatic representation of apparatus for improving the weldability of a web of foam material.

The drawing shows a roll 1 of a web of open-celled soft foam material which can be welded only with difficulty, if at all, by means of a high-frequency field or by a thermowelding method. The foam web is designated 2. It is brought into contact with a finely divided welding aid by applicator apparatus comprising a funnel-shaped reservoir 3 for the welding aid 4. A doctor 5 scrapes the welding aid leaving the open mouth of the reservoir 3 on to the engraved surface 6 of an applicator roll 7, which also serves as a feed roller for the foam web 2. Suitable welding aids generally adhere well enough to the foam web at room temperature to be transferred from the engraved surface 6 on to the large or defining web surface 8 facing the roller 7, when the web touches the roller 7. On contact with the web the welding aid, most of which is in the depressions in the engraved roller 7 in the applicator apparatus at first, is applied to the surface of the foam in the manner of a line screen or grid. The raised portions of the engraved surface 6 are preferably in the form of rhombuses or parallelgrams, so that a line screen consisting of separate dots of welding aid forms on the foam surface 8. A backup roll 9 serves to press the foam web on to the engraved roller 7, so promoting the transfer of the welding aid from the roller 7 to the surface 8 of the foam web 2. If the welding aid consists of synthetic resins with too little adhesive power to stick to the foam surface 8 at room temperature, the applicator roll 7 and, if necessary, the backup roll 9 may be heated to a moderately high temperature. Downstream of the roller 7 the surface 8 of the foam web bears regularly applied particles of welding aid 4. To ensure an optimum dose when the welding aid is applied, a brush 11 may be provided after the pair of rolls 6, 7 to brush remnants of welding aid still adhering to the applicator roll surface 6 off this surface after it has come into contact with the surface 8 of the foam web 2.

The subsequent distortion station or zone, in which the foam web is deformed or extended in the operative direction and in a horizontal plane, has a length 12. The foam web 2 is distorted by means of two pairs of rollers 13, 14 and 15, 16. The distortion reduces the thickness of the foam web 2 from a value 17 to a value 18. The web is drawn off by the roller 16, provided for this purpose with a drive 19 followed by a transmission 20 with a steplessly variable transmission ratio which can be set to the desired value by means of a lever 21. The pair of rollers 13, 14 is not driven, but the roller 13 is urged on to the roller 14 by way of the foam web 20, the contact pressure preferably being variable. The roller 14 is provided with a brake 22 in order to produce the distortion, the braking force exerted on the web 2 being set as desired by adjusting means 23 and by means of a detent 24.

It will be clear from the above that the foam web can easily be distorted or extended as desired within the possible limits by adjusting the lead of the driving or draw-off roller 16 and the variable braking action of the pair or rollers 13, 14.

The apparatus already described with reference to the drawing is itself capable of introducing the welding aid into the foam web satisfactorily if the web is relatively thin and if the particle sizes of the welding aid and the cross sections of the open cells in the foam are appropriate to one another. The welding aid can be made to penetrate farther into the foam web by means of an optional beating station situated between the pairs of rollers 13, 14 and 15, 16. The beating station is generally designated 25. It is mobile and can therefore be placed at whatever part of the moving foam web is found from experience to be the most convenient. The embodiment illustrated has two beater drums 28, 29 with beater strips 26, 27. The drum 29 may have its own drive 30, for example, a motor with a steplessly variable rotational speed, in order to relieve tensile stressing of the foam web. A mobile carriage 31 with a brake shoe 32 operable by means of a cam 33 can be locked in position anywhere along its guide rails 34 or released for adjustment purposes. The beater strips 26, 27 mesh like gears, but the flanks of the strips are highly rounded so that only the intermittent distortion or deformation of the web 2 at 35 takes place.

When the foam web 2 has passed through the pair of rollers 15, 16 relaxation of the web takes place and it returns completely or largely to its original thickness 17, the original cell structure being at least substantially recovered. It has been found that during this recovery process the positions of the welding aid particles change again and they penetrate further into the inner layers of foam in the vicinity of the central plane of the foam web. The web, now advanced by an endless belt conveyor 36, passes through a thermofixing zone or station 37 in which the welding aid particles are fixed in position in the web. To this end the fixing station 37 is provided with a plurality of supply spigots 38 for hot air. The hot air leaves the station 37 through a discharge spigot 39. The fixing station 38 may be followed by a cooling zone or station (not shown) so that the treated web cools faster and the permanent fixing of the welding aid is effected sooner.

In many cases treatment as hitherto described in the apparatus described is enough to distribute the particles of welding aid over the entire thickness of foam so that subsequent welding produces seams of adequate strength. In other cases, however, it may be an advantage for the welding aid also to be applied to, and to penetrate into, the web surface (defining surface) 10 remote from the web surface 8. This may be done by the same or similar means to those described with reference to the coating of the surface 8 of the web 2, the web being of course disposed and moved in a horizontal plane in such a way that the surface 10 is on top and the surface 8 underneath. The drawing does not illustrate coating of the other side of the web, but merely indicates by means of chain lines an area 41 in which the other large surface of the foam web may be coated by means of the same or similar, appropriately arranged apparatus as is used for coating the first large surface. If the welding aid particles are applied to and introduced into both sides of the foam web or similar article it is usually preferable not to thermofix the particles until they have been applied to both large surfaces of the web and have become embedded in the interior of the web as a result of distortion.

The apparatus shown in the upper part of the figure has a principal distortion zone 12 in which the foam web is distorted, or deformed by extension, lengthways (or in the operative direction). The web is also distorted slightly in the gaps between the various pairs of rollers 8, 9; 13, 14; 15, 16 and, if provided, in the beater apparatus 25.

Numerous variants of the design and siting of those parts of the apparatus shown in FIG. 1 are possible as regards the application and introduction of the welding aid. If the welding aid is applied by means of applicator units different from the engraved roller 6 shown in the drawing, for example, by means of scattering or spreader rollers, troughs or screens or by means of nozzles or the like, it is usually preferable first to apply the welding aid to the undistorted or underformed foam article and then to carry out distortion. This distributes the welding aid particularly evenly.

A plurality of horizontal distortion zones may be provided one after the other in the operative direction for the purpose of introducing the welding aid into the web interior. If so, relaxation zones in which the web at least substantially resumes its original shape and cell structure are preferably provided between the various distortion zones.

The lower part of the drawing illustrates the manufacture of a three-ply laminate web, the foam web with improved weldability being bonded to top and bottom covering materials. The foam web 2 carried by an endless belt conveyor 42 is fed to a heating unit 43 which heats it with hot air until the covering webs 44 and 45 can be calendered on in the gap between a pair of rollers, giving the finished three-ply laminate web 46. Alternatively the thermal bonding of covering materials to the foam web 2 may be effected by "flame bonding," in which the surface of the pretreated foam web is softened with a naked flame until it can be connected to the covering material.

Alternatively, however, the foam web 2 whose weldability has been improved may be connected to covering materials by means of adhesives. Means for applying the adhesive to the covering webs and foam web are illustrated in the drawing. The adhesive is applied to the underside 47 of the covering material web 44 by applicator apparatus 49 with a plurality of rollers and a back-up roller, and to the top of the foam web 2 and the top 48 of the covering web 45 by nozzle means 50, 51.

The various apparatus and arrangements shown in the drawing are given by way of example only. In particular the use of the devices beginning at section 41, and especially the devices following section 41, is not an essential feature of the invention, which can be performed satisfactorily by means of the previous stations or devices. The use of the latter devices, also, substantially improves the weldability of foam webs.

Webs of various open-cell soft polyurethane foams of various densities and web thicknesses were created in the apparatus illustrated in the drawing, the finely divided welding aid being introduced from both large surfaces of the foam web. The speeds of web advance were between about 8 m and 20 m per minutes. Extension of the foam webs in the operative direction in the horizontal distortion zones varied from one web to another between about 7 and about 15%, preferably about 8 to 12%, of the length of the undistorted foam web. During distortion of the foam webs in the horizontal plane and in the operative direction the thickness of the webs was reduced as already mentioned. For example, a web 5 mm thick, made from a soft polyurethane foam based on a polyether polyol with a density of 35 kg/m$^3$, was reduced in thickness by approximately 5% when extended 10% in the operative direction.

In the case of webs made from a self-extinguishing, phosphorus-containing polyester polyurethane soft foam with open cells optimum results as regards the improvement in weldability were obtained—depending on the thickness of the web—with the following quantities of welding aid:

| Density kg/m$^3$ | Web Thickness mm | Welding Aid g/m$^2$ |
|---|---|---|
| 35 | 2 | 30 |
| 35 | 5 | 40 |
| 35 | 10 | 50 |

In the case of webs made from a soft polyether-based polyurethane foam satisfactorily weldability was obtained under the following conditions:

| Density kg/m$^3$ | Web Thickness mm | Welding Aid g/m$^2$ |
|---|---|---|
| 35 | 5 | 60 |
| 22 | 10 | 80 |

The welding aids quantities stated in the tables are applied to each of the two large surfaces of the web. The total quantities applied and introduced are therefore double these quantities.

The welding aid used for these at least partly open-celled soft polyurethane foams was a finely divided copolymer consisting of approximately 87.5% by weight vinyl chloride and approximately 12.5% by weight vinyl acetate, as sold, for example, by Henkel & Cie. GmbH, Duesseldorf, German Federal Republic, under the name "Q 5004." This is a polydisperse suspension polymer with particle sizes between 1 and 200 microns and a maximum in the particle size distribution at 50 to 70 microns. Electron micrographs of this product reveal that the particles are predominantly spherical and that there are depressions and spherical projections on their surfaces. The K-value as per Fikentscher is 48.2. Differential thermal analysis of the copolymer with a Du- Pont Differential Thermal Analyzer 900 shows a slight step at 70°C. to 75°C., indicating a transformation zone (glass-transition temperature) in this temperature range. An exothermal decomposition reaction of the product, beginning at 300°C. is also revealed by differential thermal analysis. The copolymer is soluble in cyclohexanone.

The various embodiments of the invention can be used to make a very large number of foam articles of improved weldability and to make a very large number of welded products from these articles. Examples of suitable applications are foam padding as used, for example, for seating in motor cars, railway trains, ships and aircraft and for other furniture. Such padding is also suitable for any hard components requiring padding in these fields. Other applications are mattresses, bed coverings, padding for clothing, tents, camping gear, cooling bags and other cooling receptacles, permabulators, shoes, bags, luggage, small fitted cases and the like.

The invention has various considerable advantages. Articles made from plastic foams which have previously been weldable only with difficulty, if at all, can be rendered weldable with highly satisfactory results at very little cost. The processes and apparatus concerned are highly economical, since the costs of plant, welding aid, power and labor are low. Also, the process for improving the weldability of foam webs can easily be fully automated. Such installations have a high production rate and a low incidence of breakdowns and require very few operators. Another advantage of the invention is that the processes of improving the weldability of the plastic foam articles and then welding the articles do not have any appreciable bad effects on the composition or properties of the foams. This also removes the necessity—otherwise frequent in the case of soft polyurethane-based foams—of "reticulation," in which an attenuated oxyhydrogen gas explosion is produced in the foam in order to improve its weldability.

The invention is hereby claimed as follows:

1. A process of improving weldability of a flexible foam article in which the foam structure contains at least some open cells which comprises distorting such article and bringing it into contact with a welding aid while it is in a distorted condition, said welding aid being in the form of discrete particles which can enter said open cells and which enhance the weldability of the resultant article, and said welding aid being a thermoplastic organic polymer having a lower limit for the melting point or softening range of at least 90°C. and an upper limit below that at which said foam article is damaged when welded to another article.

2. A process as claimed in claim 1 in which said welding aid consists essentially of a copolymer of 70% to 90% by weight vinyl chloride and 30% to 10% by weight vinyl acetate in the form of particles which are essentially spherical with particle sizes principally in the range of 1.5 to 200 microns.

3. A process of improving weldability of a flexible foam article in which the foam structure contains at least some open cells which comprises bringing a moving foam web of soft polyurethane foam with at least largely open cells into contact with a welding aid in the form of a finely divided vinyl chloride-vinyl acetate copolymer so that the welding aid is applied to one of the two large surfaces of the foam web, the foam web, arranged so that the large surface to which the welding aid has been applied is lying on top, distorting said foam web in a horizontal plane and in the operative direction in as least one distortion zone so that the open cells of the soft polyurethane foam assume cross sections such that at least a substantial proportion of the finely divided welding aid penetrates into the interior of the web, applying said finely divided welding aid to the other large surface of the foam web and introducing it into the interior of the foam web in substantially the same manner as into the first large surface, and passing the foam web to a relaxation zone in which it at least resumes its predistortion shape.

4. A process as claimed in claim 3, characterized in that the foam web is 1 to 20 mm thick and the distortion in the operative direction and in the horizontal plane causes extension of the foam web by 7 to 15% in the operative direction.

5. A process as claimed in any of the claims 3, characterized in that the welding aid used is a copolymer of 70% to 90% by weight vinyl chloride and 30% to 10% by weight of vinyl acetate with a particle size between 1 and 250 microns, and approximately 15 to approximately 150 g welding aid per $m^2$ of the foam surface are applied from each of the two large surfaces of the foam web.

6. A process of improving weldability of a flexible foam article in which the foam structure contains some at least open cells which comprises distorting such article and bringing it into contact with a welding aid while it is in a distorted condition, said welding aid being in the form of discrete particles which can enter said open cells and which enhance the weldability of said article, heating said article after it has been distorted and brought into contact with said welding aid sufficiently to soften the welding aid and to enhance the adherence of said particles by thermofixing them to the cell walls, the softening of the welding aid during thermofixing being effected by means of hot air.

7. A process of improving weldability of a flexible foam web in which the foam structure contains at least some open cells which comprises distorting such web and bringing it into contact with a welding aid while it is in a distorted condition, said welding aid being in the form of discrete particles which can enter said open cells and which enhance the weldability of said web, and heating said web after both surfaces have been distorted and brought into contact with said welding aid sufficiently to soften the welding aid and to enhance the adherence of said particles by thermofixing them to the cell walls.

8. A process as claimed in claim 7, characterized in that after the welding aid has been incorporated and then thermofixed at least one of the large surfaces of the foam web is connected to a covering material to form a laminate.

9. A process as claimed in claim 8, characterized in that a web of covering material is calendered on to each of the two large surfaces of the foam web.

10. A process as claimed in claim 9, characterized in that the covering material web provided as the surface sheet is an imitation leather web made from plasticized polyvinyl chloride or a web of furniture covering material, and the covering material web provided as the backing is a web of light weight textile material.

11. A process as claimed in claim 10, characterized in that a fleece of weldable material is provided in the web of imitation leather or of furniture covering material.

12. A process of improving weldability of a flexible foam article in which the foam structure contains at least some open cells which comprises distorting such article and bringing it into contact with a welding aid while it is in a distorted condition, said welding aid being in the form of discrete particles which can enter said open cells and which enhance the weldability of the resultant article, relaxing said distorted condition to a non-distorted condition after said welding aid has been applied to the article in its distorted condition, and welding said article to another article after said distorted condition has been relaxed by high frequency welding.

13. A process of improving weldability of a flexible foam article in which the foam structure contains at least some open cells which comprises distorting such article and bringing it into contact with a welding aid while it is in a distorted condition, said welding aid being in the form of discrete particles which can enter said open cells and which enhance the weldability of the resultant article, relaxing said distorted condition to a non-distorted condition after said welding aid has been applied to the article in its distorted condition, and welding said article to another article after said distorted condition has been relaxed by thermal contact welding or thermal impulse welding.

14. A process of improving weldability of a flexible foam web article in which the foam structure contains at least some open cells which comprises distorting such article and bringing it into contact with a welding aid while it is in a distorted condition, said welding aid being in the form of discrete particles which can enter said open cells and which enhance the weldability of the resultant article, relaxing said distorted condition to a non-distorted condition after said welding aid has been applied to said foam web in its distorted condition and welding both surfaces of said foam web to covering materials to form a laminate after said distorted condition has been relaxed.

15. A weldable flexible foam article in which the foam structure contains at least some open cells, said article being capable of being distorted and of returning substantially to its original shape after distortion and containing in said open cells a finely divided solid welding agent distributed from the surface of the article into the interior thereof a distance of at least 20% of the article thickness.

16. An article as claimed in claim 15 in the form of a web having a thickness of 1 to 20 millimeters.

* * * * *

UNITED STATES PATENT AND TRADEMARK OFFICE
CERTIFICATE OF CORRECTION

PATENT NO. : 3,906,134
DATED : September 16, 1975
INVENTOR(S) : GERHARD POHL

It is certified that error appears in the above-identified patent and that said Letters Patent are hereby corrected as shown below:

Column 1, line 69, "air" should read --aid--.

Column 2, line 48, "air" should read --aid--.

Column 13, line 24, "8" should read --7--.

Column 16, claim 5, line 1, "any of the claims" should read --claim--.

Signed and Sealed this twenty-third Day of December 1975

[SEAL]

Attest:

RUTH C. MASON
*Attesting Officer*

C. MARSHALL DANN
*Commissioner of Patents and Trademarks*

REEXAMINATION CERTIFICATE (389th)

United States Patent [19]

Pohl

[11] B1 3,906,134

[45] Certificate Issued Sep. 24, 1985

[54] WELDABILITY OF ARTICLES MADE FROM PLASTIC FOAMS

[75] Inventor: Gerhard Pohl, Giessen, Fed. Rep. of Germany

[73] Assignee: Zwissler Ulrich Dr., Gerstetten, Fed. Rep. of Germany

Reexamination Request:
No. 90/000,537, Apr. 4, 1984

Reexamination Certificate for:
Patent No.: 3,906,134
Issued: Sep. 16, 1975
Appl. No.: 240,656
Filed: Apr. 3, 1972

Certificate of Correction issued Dec. 23, 1975.

05231990

[30] Foreign Application Priority Data

Apr. 2, 1971 [DE]  Fed. Rep. of Germany ....... 2116092
May 13, 1971 [DE]  Fed. Rep. of Germany ....... 2123845

[51]  Int. Cl.$^4$ .......................... B32B 7/14; B32B 33/00

[52]  U.S. Cl. .................... 156/229; 156/274.6; 156/283; 156/291; 156/320; 428/206

[58]  Field of Search ....................... 156/77, 164, 274.6, 156/276, 279, 283, 290, 320, 494, 495, 496, 229, 320, 291; 428/206

[56] References Cited

U.S. PATENT DOCUMENTS 3,150,024  9/1964  Penman ............................... 156/229
3,734,813  5/1973  Pohl ..................................... 161/148

FOREIGN PATENT DOCUMENTS 1903667  11/1970  Fed. Rep. of Germany .
1936199  2/1971  Fed. Rep. of Germany .
1209048  10/1970  United Kingdom .

*Primary Examiner*—Caleb Weston

[57] ABSTRACT

The invention relates to the improvement of the weldability of articles of porous plastics, in particular of flexible polyurethane foams with an at least partial open cell structure. The improvement is obtained by incorporating a finely divided welding auxiliary into the porous article while stretching or mechanically deforming the porous article in at least one direction.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3-5 and 12-14 is confirmed.

Claims 1, 2, 6-11, 15 and 16 are cancelled.

* * * * *